United States Patent [19]

Kajiwara

[11] Patent Number: 4,961,146
[45] Date of Patent: Oct. 2, 1990

[54] AUTOMOBILE SPEED CONTROL APPARATUS WITH CREEP CONTROL

[75] Inventor: Yasuya Kajiwara, Himeji, Japan

[73] Assignee: Mitsubishi Denki Kabushiki Kaisha, Tokyo, Japan

[21] Appl. No.: 430,047

[22] Filed: Nov. 1, 1989

[30] Foreign Application Priority Data

Nov. 8, 1988 [JP] Japan .................................. 63-283012
Nov. 8, 1988 [JP] Japan .................................. 63-283013

[51] Int. Cl.$^5$ ............................................. B60K 31/00
[52] U.S. Cl. .............................. 364/426.04; 180/179
[58] Field of Search ...................... 364/426.04, 426.01; 123/351, 352, 357, 358, 359; 180/177–179

[56] References Cited

U.S. PATENT DOCUMENTS

| 3,952,236 | 4/1976 | Hoover | 318/139 |
| 4,541,052 | 9/1985 | McCulloch | 180/179 |
| 4,553,448 | 11/1985 | Youngers et al. | 74/479 |
| 4,709,335 | 11/1987 | Okamoto | 364/426.04 |
| 4,714,864 | 12/1987 | Yogo et al. | 364/426.04 |
| 4,830,156 | 5/1989 | Bellah et al. | 74/475 |
| 4,850,250 | 7/1989 | Nehmer et al. | 180/179 |
| 4,855,918 | 8/1989 | Gray | 364/426.04 |

FOREIGN PATENT DOCUMENTS 61-247525 7/1986 Japan .
61-255252 10/1987 Japan .

Primary Examiner—Parshotam S. Lall
Assistant Examiner—Tyrone Queen
Attorney, Agent, or Firm—Sughrue, Mion, Zinn, Macpeak & Seas

[57] ABSTRACT

A speed control apparatus for a vehicle performs cruise control at high vehicle speeds, creep control at low vehicle speeds, and wheel slip suppression at high and low vehicle speeds by controlling the degree of opening of the throttle valve of the vehicle. During creep control, a control unit controls the degree of opening of the throttle valve in accordance with the vehicle speed and the amount of depression of the brake pedal by the driver. When the brake pedal is not depressed, the control unit controls the throttle valve so that the vehicle runs at a predetermined creep speed. When the brake pedal is depressed, the brakes are applied and the control unit decreases the opening of the throttle valve. When a wheel slip sensor detects slipping of the wheels, the control unit decreases the throttle valve opening until slipping is no longer detected.

5 Claims, 2 Drawing Sheets

AUTOMOBILE SPEED CONTROL APPARATUS WITH CREEP CONTROL

BACKGROUND OF THE INVENTION

This invention relates to a speed control apparatus for an automotive vehicle. More particularly, it relates to a speed control apparatus which is capable of performing cruise control at high vehicle speeds, creep control at low vehicle speeds, and wheel slip suppression at all vehicle speeds.

Cruise control devices which maintain a constant vehicle speed when a vehicle is running at high speeds have existed for many years. Recently, creep control devices for low vehicle speeds have been proposed. A creep control device is a device which maintains the speed of a vehicle constant when the vehicle is "creeping", i.e., running at low speeds, such as when it is travelling in congested traffic. For example, Japanese Published Unexamined Patent Application No. 61-247525 discloses a creep control device in which, during creep control, a control unit adjusts the degree of opening of a throttle valve so as to maintain a constant, set vehicle speed as long as the accelerator pedal is depressed. During creep control, the vehicle speed is independent of the amount of depression of the accelerator pedal. When the driver removes his foot from the accelerator pedal, the control unit automatically applies the brakes and stops the vehicle. That apparatus has the disadvantage that the driver can not control the creep speed (the vehicle speed during creep control), which is set in advance.

Japanese Published Unexamined Patent Application No. 62-255252 discloses a creep control apparatus in which the throttle valve and the brakes of a vehicle are both controlled by a control unit so as to maintain a predetermined creep speed. Creep control is performed only when the driver is not stepping on either the accelerator pedal or the brake pedal. That apparatus has the disadvantage that the creep speed is set in advance and can not be easily adjusted by the driver. It also has the disadvantage that since it controls both the- throttle valve and the brakes of a vehicle, it tends to be large and expensive.

SUMMARY OF THE INVENTION

Accordingly, it is an object of the present invention to provide a speed control apparatus for an automotive vehicle which enables the driver of the vehicle to freely adjust the creep speed.

It is another object of the present invention to provide a speed control apparatus for an automotive vehicle which can perform both cruise control at high vehicle speeds and creep control at low vehicle speeds.

It is yet another object of the present invention to provide a speed control apparatus which can suppress slipping of the wheels of the vehicle.

It is a further object of the present invention to provide a speed control apparatus which has a simple structure and is inexpensive.

A speed control apparatus for an automotive vehicle according to the present invention is equipped with a throttle actuator, a brake pedal depression sensor which senses the amount of depression of the brake pedal of the vehicle, and a creep control means in the form of a control unit. The control unit performs creep control at low vehicle speeds by controlling the degree of opening of a throttle valve using the throttle actuator in accordance with the amount of depression of the brake pedal by the driver of the vehicle. When the brake pedal is not depressed, the control unit controls the throttle valve using the throttle actuator so that the vehicle will move at a predetermined creep speed. If the driver steps on the brake pedal while creep control is being performed, the brakes are applied, and at the same time, the control unit controls the throttle actuator so as to decrease the throttle valve opening in accordance with the amount of depression of the brake pedal. By adjusting the amount of depression of the brake pedal, the driver can easily adjust the creep speed.

The control unit may also include cruise control means for controlling the vehicle speed when the vehicle is cruising at high speeds. A speed setter may be provided which provides the control unit with a signal indicating a cruising speed desired by the driver. The cruise control means of the control unit performs feedback control of the throttle actuator so that the vehicle will move at the desired cruising speed.

A speed control apparatus according to the present invention may also be equipped with a wheel slip sensor which senses slipping of the wheels of the vehicle, and the control unit may include wheel slip suppression means for suppressing wheel slipping. When the wheel slip sensor detects wheel slipping, the wheel slip suppression means of the control unit controls the throttle actuator to reduce the throttle valve opening and thus the output of the engine until slipping is no longer detected.

DESCRIPTION OF THE PREFERRED EMBODIMENT

Figure 1:
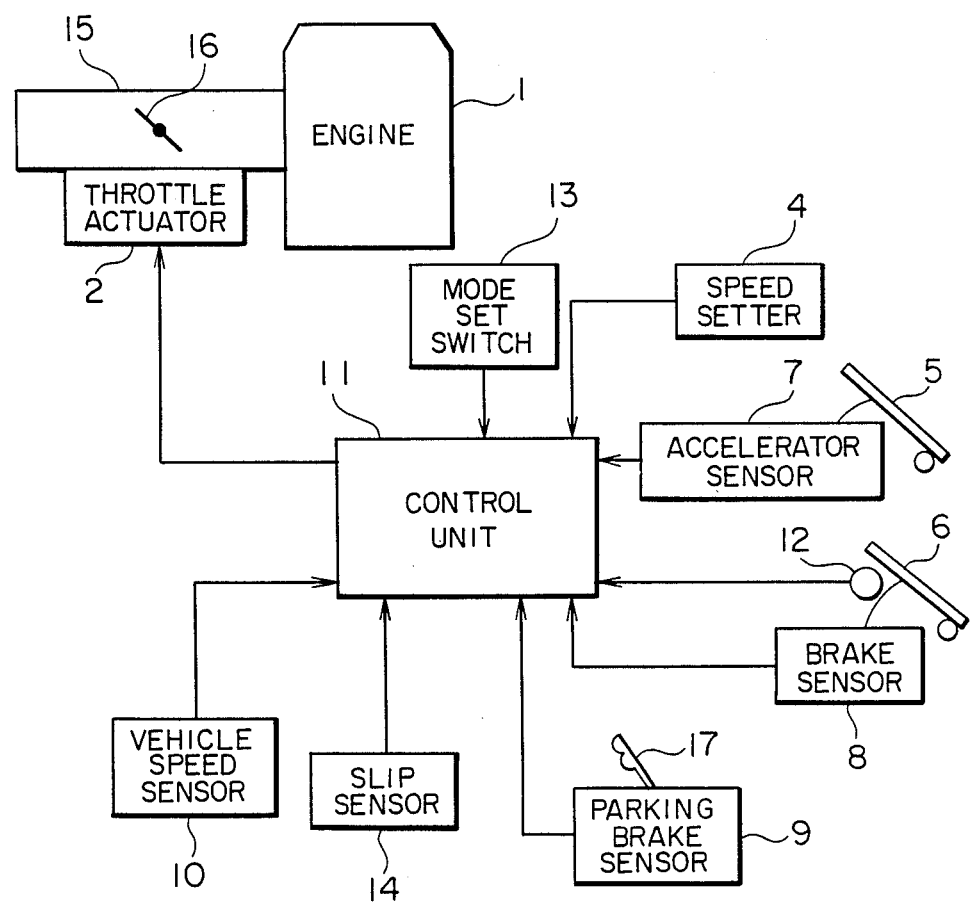
FIG. 1 is a block diagram of an embodiment of a speed control apparatus according to the present invention.

A preferred embodiment of a speed control apparatus according to the present invention will now be described while referring to FIG. 1, which is a block diagram of this embodiment. As shown in this figure, the engine 1 of an unillustrated automotive vehicle is equipped with an air intake pipe 15 in which a throttle valve 16 is pivotally mounted. The throttle valve 16 can be opened and closed by a throttle actuator 2, which is controlled by a control unit 11. The control unit 11 functions as a cruise control means for performing cruise control at high vehicle speeds, a creep control means for performing creep control at low vehicle speeds, and a slip suppression means for suppressing wheel slip at either high or low vehicle speeds. A speed setter 4 provides the control unit 11 with a signal indicating a set vehicle speed. An accelerator sensor 7 which is responsive to the movement of the accelerator pedal 5 of the vehicle provides the control unit 11 with a signal indicating whether the accelerator pedal 5 is depressed. Similarly, a brake sensor 8 which is sensitive to the movement of the brake pedal 6 of the vehicle provides the control unit 11 with a signal indicating whether the brake pedal 6 is depressed. A brake pedal depression sensor 12, which is also sensitive to the movement of the brake pedal 6, provides the control unit 11 with a signal indicating the amount of depression of the brake pedal 6. A parking brake sensor 9 which is sensitive to the movement of the parking brake lever 17 of the vehicle provides the control unit 11 with a signal indicating whether the parking brake is applied or not. A vehicle speed sensor 10 senses the speed of the vehicle and provides the control unit 11 with a corresponding signal. A mode set switch 13 enables the driver of the vehicle to indicate to the control unit 11 his desire to perform creep control of the vehicle at low vehicle speeds or cruise control at high vehicle speeds.

This embodiment is also equipped with a wheel slip sensor 14, which detects when the unillustrated wheels of the vehicle are slipping. The wheel slip sensor 14 provides the control unit 11 with a signal indicating whether or not slipping is taking place. Any type of wheel slip sensor can be employed, such as one which compares the rotational speeds of the front and rear wheels of the vehicle and determines that slipping is occurring when the front wheel and rear wheel speeds differ by more than a prescribed amount.

Figure 2:
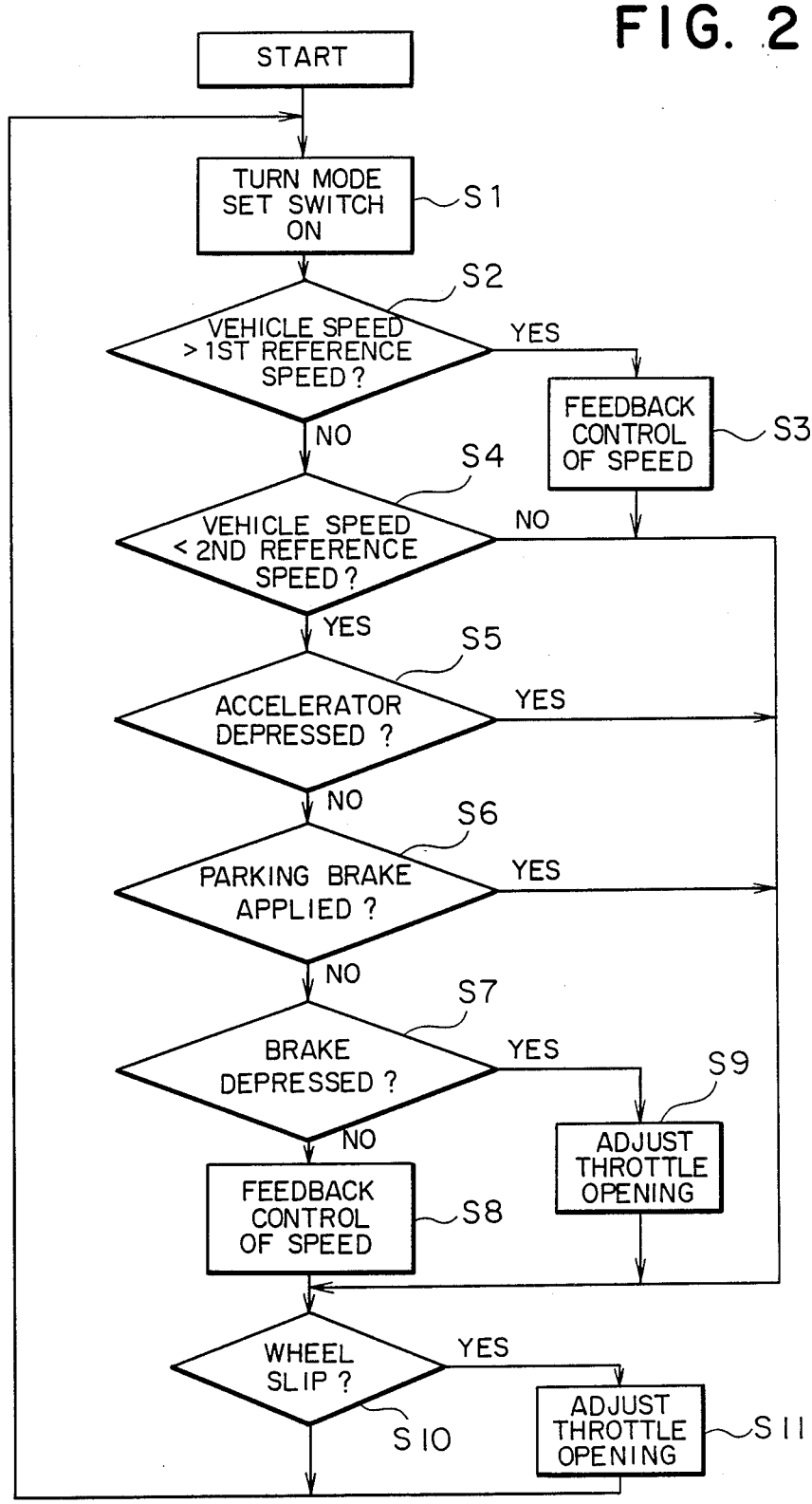
FIG. 2 is a flow chart of the operation of the embodiment of FIG. 1.

FIG. 2 is a flow chart of the operation of the embodiment of FIG. 1 when performing speed control. At high speeds, this embodiment performs cruise control and maintains a constant vehicle speed which was selected by the driver. At low speeds, this embodiment performs creep control and maintains a constant vehicle speed in accordance with the amount of depression of the brake pedal. At both high and low speeds, it suppresses slipping of the wheels.

First, in Step S1 of FIG. 2, the driver of the vehicle turns on the mode set switch 13. In this embodiment, cruise control is performed only when the vehicle speed is greater than a first reference speed, such as 50 km/hour, while creep control is performed only when the vehicle speed is less than a second reference speed, such as 20 km/hour. In Step S2, if the vehicle speed sensor 10 indicates that the vehicle speed is above the first reference speed, then in Step S3, cruise control is carried out. During cruise control, the control unit 11 performs feedback control of the throttle actuator 2 so as to maintain the vehicle speed equal to the speed at the time that the mode set switch 13 was turned on. In Step S2, if the vehicle speed is not greater than the first reference speed, then in Step S4, the control unit 11 determines if the vehicle speed as indicated by the vehicle speed sensor 10 is less than the second reference speed. If it is not, then the program proceeds to Step S10, but if the speed is less than the second reference speed, then in Steps S5 and S6, the control unit 11 determines whether to perform creep control.

In Step S5, the control unit 11 determines whether the accelerator pedal 5 is depressed based on the output of the accelerator sensor 7. If the accelerator pedal 5 is depressed, then creep control is not performed and the program proceeds to Step S10. If the accelerator pedal 5 is not depressed, then in Step S6, the control unit 11 determines if the parking brake is applied based on the output of the parking brake sensor 9. If the parking brake is applied, then creep control is not performed and the program proceeds to Step S10. At this point, unless the accelerator is depressed, the control unit 11 fully closes the throttle valve 16 to reduce the engine output to as low a level as possible. If the parking brake is not applied, then creep control is performed and the program proceeds to Step S7.

In Step S7, the control unit 11 determines whether the brake pedal 6 is depressed based on the output of the brake sensor 8. If the brake pedal 6 is not depressed, then in Step S8, the control unit 11 performs feedback control of the throttle actuator 2 so as to maintain the vehicle speed constant at the level set by the speed setter 4. In order to maintain the set speed on an uphill slope, the control unit 11 increases the degree of opening of the throttle valve 16 to increase the engine output, whereas on a downhill slope, the control unit 11 decreases the degree of opening of the throttle valve 16 to decrease the engine output.

In Step S7, if it is determined that the brake pedal 6 is depressed, then in Step S9, the control unit 11 decreases the degree of opening of the throttle valve 16 in accordance with the amount of depression of the brake pedal 6, as indicated by the brake pedal depression sensor 12, and thereby decreases the engine output. At the same time, the depression of the brake pedal 6 actuates the brakes, so the speed of the vehicle is decreased both by a decrease in the engine output and by the application of the brakes. If the brake pedal 6 is depressed more strongly, the control unit 11 closes the throttle valve 16 completely and the application of the brakes brings the vehicle to a complete stop.

In Step S10, if the wheel slip sensor 14 detects wheel slipping, then in Step S11, the control unit 11 controls the throttle actuator 2 to decrease the throttle valve opening, thereby decreasing the engine output. The program then recycles to Step S1. During each subsequent pass through the program, the control unit 11 will continue to decrease the degree of opening of the throttle valve 16 until the wheel slip sensor 14 no longer detects any slipping. In this manner, wheel slipping is completely and rapidly suppressed.

The embodiment of FIG. 1 can be adapted to perform creep control without performing cruise control by reprogramming the control unit 11 so as to delete Steps S2 and S3 of FIG. 2. Similarly, if it is not desired to perform wheel slip suppression, the control unit 11 can be reprogrammed to delete Steps S10 and S11, in which case the program would recycle from Steps S8 or S9 directly to Step S1. If the apparatus is used to perform only creep control, the speed setter 4 can be eliminated, and the predetermined creep speed can be stored in an internal memory of the control unit 11.

As is clear from the preceding description, a speed control apparatus according to the present invention can perform both cruise control at high vehicle speeds and creep control at low vehicle speeds. Creep control is especially advantageous when travelling in congested traffic for long periods of time, when parking a vehicle in a garage, or when passing another vehicle along a narrow road. The driver is relieved of the need to repeatedly step on the accelerator or brake pedals as in a conventional automobile, so driving in such situations is much less fatiguing. In addition, when creep control is performed, the driver can easily adjust the speed of creep control by depressing the brake pedal.

The present invention can also perform wheel slip suppression at all vehicle speeds, thereby maintaining the directional stability of the vehicle.

As a speed control apparatus according to the present invention controls vehicle speed by controlling only the degree of opening of the throttle valve, it is simpler, more compact, and less expensive than speed control apparatuses which control both the throttle opening and the application of the brakes.

What is claimed is:

1. A speed control apparatus for an automotive vehicle comprising:

a throttle valve actuator for opening and closing a throttle valve of the vehicle;

a brake pedal depression sensor for sensing the amount of depression of a brake pedal of the vehicle;

a vehicle speed sensor for sensing the speed of the vehicle; and slow speed creep control means responsive to the brake pedal depression sensor and the vehicle speed sensor for controlling the throttle valve actuator to adjust the throttle valve opening in accordance with the sensed amount of depression of the brake pedal and the sensed vehicle speed only when the vehicle speed is below a predetermined, creep control enabling level.

2. A speed control apparatus as claimed in claim 1, wherein the creep control means comprises means for controlling the throttle valve actuator to adjust the throttle valve opening to a level necessary to maintain a predetermined creep speed when the brake pedal is not depressed, and for controlling the throttle valve actuator to reduce the throttle valve opening to a level less than that necessary to maintain the predetermined creep speed when the brake pedal is depressed.

3. A speed control apparatus as claimed in claim 1, further comprising:

a wheel slip sensor for sensing slip of the wheels of the vehicle; and slip control means responsive to the wheel slip sensor for controlling the throttle actuator to decrease the throttle valve opening until wheel slip no longer occurs.

4. A speed control apparatus as claimed in claim 1, further comprising high speed cruise control means for controlling the throttle valve actuator to maintain a prescribed vehicle speed when the vehicle speed is above a predetermined, cruise control enabling level.

5. A speed control apparatus as claimed in claim 3, further comprising high speed cruise control means for controlling the throttle valve actuator to maintain an prescribed vehicle speed when the vehicle speed is above a predetermined, cruise control enabling level.

* * * * *